US005579134A

United States Patent [19]

Lengyel

[11] Patent Number: 5,579,134

[45] Date of Patent: Nov. 26, 1996

[54] PRISMATIC REFRACTING OPTICAL ARRAY FOR LIQUID FLAT PANEL CRYSTAL DISPLAY BACKLIGHT

[75] Inventor: J. Michael Lengyel, Ramona, Calif.

[73] Assignee: Honeywell Inc., Minneapolis, Minn.

[21] Appl. No.: 348,271

[22] Filed: Nov. 30, 1994

[51] Int. Cl.[6] .......... G02F 1/13

[52] U.S. Cl. .......... 359/49; 359/63; 359/42; 362/31; 362/26; 362/330; 362/339

[58] Field of Search .......... 362/31, 26, 82, 362/330, 339; 359/48, 49, 50, 42, 63

[56] References Cited

U.S. PATENT DOCUMENTS

| | | | |
|---|---|---|---|
| 2,356,654 | 8/1944 | Cullman | 362/223 |
| 2,551,954 | 5/1951 | Lehman | 359/592 |
| 2,623,160 | 12/1952 | McPhail | 362/223 |
| 2,648,763 | 8/1953 | Rolph et al. | 240/51.11 |
| 3,838,909 | 10/1974 | Fitzgibbons | 359/40 |
| 3,863,246 | 1/1975 | Trcka et al. | 359/48 |
| 3,947,091 | 3/1976 | Trcka | 359/66 |
| 3,957,351 | 5/1976 | Stockwell | 359/40 |
| 4,071,750 | 1/1978 | Schneppendahl et al. | 362/217 |
| 4,264,147 | 4/1981 | Baur et al. | 359/50 |
| 4,278,327 | 7/1981 | McMahon et al. | 350/347 |
| 4,330,813 | 5/1982 | Deuthsch | 362/244 |
| 4,618,216 | 10/1986 | Suzawa | 359/49 |
| 4,708,439 | 11/1987 | Ishii et al. | 350/331 R |
| 4,726,662 | 2/1988 | Cromack | 350/345 |
| 4,913,529 | 4/1990 | Goldenberg et al. | 350/337 |
| 4,915,479 | 4/1990 | Clarke | 350/345 |
| 4,924,356 | 5/1990 | French et al. | 362/223 |
| 4,969,730 | 11/1990 | van den Brandt | 353/31 |
| 4,986,631 | 1/1991 | Aoki et al. | 350/112 |
| 4,995,701 | 2/1991 | Brown | 350/276 R |
| 5,034,864 | 7/1991 | Oe et al. | 362/224 |
| 5,050,946 | 9/1991 | Hathaway et al. | 385/33 |
| 5,098,184 | 3/1992 | van den Brandt et al. | 359/622 |
| 5,128,783 | 7/1992 | Abileah et al. | 359/49 |
| 5,184,881 | 2/1993 | Karpen | 362/1 |
| 5,211,467 | 5/1993 | Seder | 362/84 |
| 5,394,255 | 2/1995 | Yokota et al. | 359/49 |
| 5,396,406 | 3/1995 | Ketchpel | 362/27 |
| 5,402,324 | 3/1995 | Yokoyama et al. | 362/19 |
| 5,414,599 | 5/1995 | Kaneko et al. | 362/31 |
| 5,442,523 | 8/1995 | Kashima et al. | 362/31 |

FOREIGN PATENT DOCUMENTS

| | | |
|---|---|---|
| 3588504 | 3/1994 | European Pat. Off. . |
| 0597261 | 5/1994 | European Pat. Off. . |
| 6102507 | 4/1994 | Japan . |
| 619084 | 3/1949 | United Kingdom . |
| 878215 | 9/1961 | United Kingdom . |

*Primary Examiner*—William L. Sikes
*Assistant Examiner*—Kenneth Parker
*Attorney, Agent, or Firm*—Kenneth J. Johnson; Ronald E. Champion

[57] ABSTRACT

A prismatic refracting array for a flat panel liquid crystal display (LCD) backlighting device matches a prismatic angle with the critical angle of the exit window and surrounding material, e.g., glass and air. By selecting the prism angle of the refracting array with reference to the critical angle of the exit window and surrounding air, light lost to total internal reflectance within the exit window is substantially eliminated while directing all light output within selected view angles. By better utilizing the available light output from the flat panel backlight device, overall efficiency of the LCD device is improved.

19 Claims, 3 Drawing Sheets

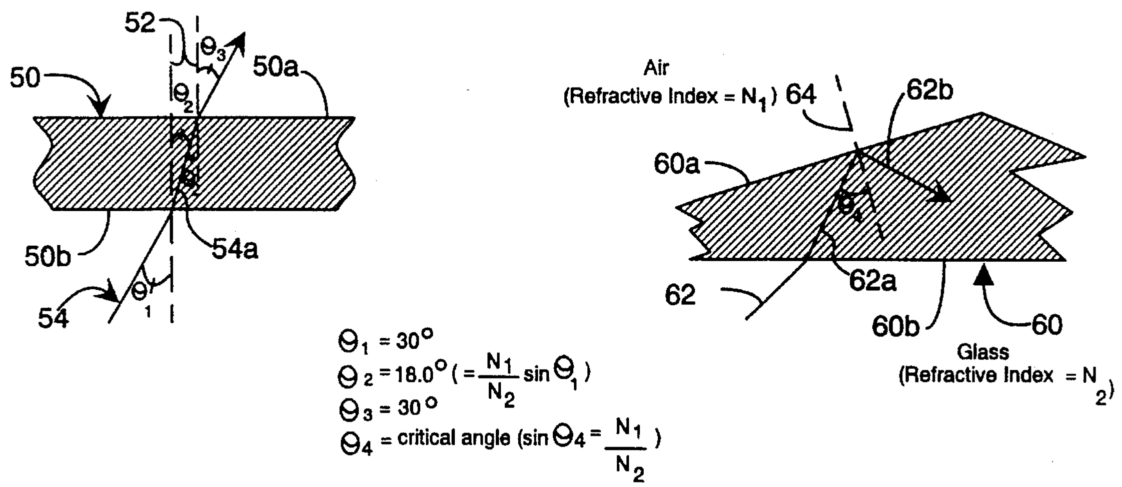
$\Theta_1 = 30°$
$\Theta_2 = 18.0° \left(= \frac{N_1}{N_2} \sin\Theta_1\right)$
$\Theta_3 = 30°$
$\Theta_4$ = critical angle $\left(\sin\Theta_4 = \frac{N_1}{N_2}\right)$
FIG. 4A
FIG. 4B
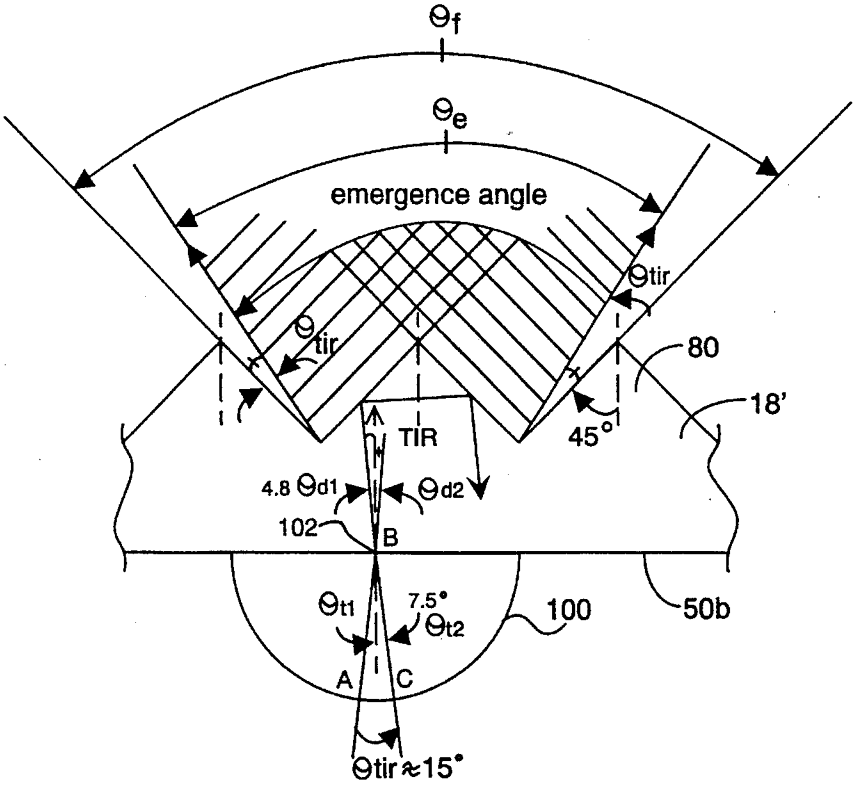
FIG. 5

$$\theta_c = \theta_f = 40.2^\circ$$

$$\theta_e = 80.4^\circ$$

PRISMATIC REFRACTING OPTICAL ARRAY FOR LIQUID FLAT PANEL CRYSTAL DISPLAY BACKLIGHT

BACKGROUND OF THE INVENTION

The present invention relates generally to efficient use of light output in a backlight for a liquid crystal display device, and particularly to minimization of light lost to internal reflectance.

Obtaining the maximum light energy output for a given power input to a fluorescent lamp used a backlight in an active matrix liquid crystal display (AMLCD) is an important operational feature. In particular, AMLCD devices transmit very little of the backlight provided. For a color AMLCD, only 2.5% to 4% of the backlight passes through the AMLCD. For monochrome applications, up to 12% of the backlight passes through the liquid crystal display (LCD). In either case, the most efficient extraction of light from the backlight must be achieved to maximize the light output from the display device for a given power input. The lumens (light out) per watt (power in) conversion in a LCD backlight system can be taken as a measure of efficiency for a fluorescent lamp backlight system. Minimizing light loss improves this measure of efficiency.

As a result of inherent limitations in the AMLCD, the viewing angles are generally restricted in both vertical and horizontal directions. Consequently, it is desirable to restrict, as much as possible, the visible light produced within given horizontal and vertical view angles such that a user of the LCD device receives the maximum available light when observing the display within the view angles. The result is improved contrast in images presented on the LCD device. It is desirable, therefore, to redirect light which would otherwise exit beyond the view angles to minimize losses resulting from absorption inside the housing. Prior engineering efforts have attempted to develop diffuse, uniform illumination backlighting for AMLCDs. In conventional backlight schemes, a diffused light from the backlight is generally emitted into a very wide cone, much larger than the viewing cone typically defined by the horizontal and vertical viewing angles of the AMLCD. Light emitted from the backlight at angles between the defined viewing angles and 90 degrees to the display normal is not used efficiently to produce viewable luminance on the face of the flat panel display. Accordingly, a larger portion of the light emitted in these regions is unavailable to the viewer.

Prior methods of optically redirecting the light output of the backlight include Fresnel lenses and non-imaging optical reflectors. Fresnel lenses offer good diffusion, but light is lost due to spacing between the lenses and the directional capabilities are not readily controlled. Non-imaging optical reflector arrays can offer good direction and efficient performance for a single fluorescent lamp tube. However, "dead bands" occur at the reflector junctions when a larger area is to be illuminated with multiple lamp legs. This is highly undesirable for flat panel display applications which require uniform illumination over a large surface.

Directional gain via prismatic refraction may be provided by use of Scotch™ optical lighting film (SOLF) which operates on the principal of total internal reflectance. The SOLF requires the use of a supplementary filter or reflector to diffuse light before redirecting it over the target area. SOLF is normally manufactured with 45 degrees V-grooves running in one direction.

It is desirable, therefore, that an LCD display device make more effective use of the light produced by a light source used as a backlight by directing more of the available light within given viewing angles of the display such that the light energy otherwise lost by emission outside of the AMLCD viewing angle is directed within the field of view of the display.

SUMMARY OF THE INVENTION

In accordance with the preferred embodiment of the present invention, light energy not properly directed within a desired view angle emerges from the display within the view angle by use of prismatic refracting optical formations on a light box exit window to produce bi-axial directional gain from the omniradiant backlight assembly. The prismatic array provides the necessary light gathering and directing characteristics to create a relatively higher luminance on the front of the display panel and within given view angles.

The present invention provides, in the preferred form, pyramid shaped prisms having a prism angle matching the critical angle of the interfacing materials to reduce light lost to total internal reflectance and establish suitable horizontal and vertical emergence or view angles for use in LCD displays. The present invention thereby directs the emitted light from a diffuse emitting surface, e.g., a flat panel backlight, to increase the luminance on the face of the display and concentrate the illumination pattern of the backlight into a field of view commensurate with horizontal and vertical view angle requirements of AMLCD devices. In this manner directional gain in both vertical and horizontal dimensions directs the light output of the display device for optimum viewing, and thereby improves energy efficiency by increasing light energy output within given view angles for the same energy input.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIGS. 4A and 4B illustrate Snell's Law where the angle of refraction is governed by the indices of refraction of the interfacing materials, and the physics of total internal reflectance where a critical angle is a function of the indices of refraction of the interfacing materials.

FIG. 5 illustrates refraction and light lost to total internal reflectance in a prismatic refracting array.

DETAILED DESCRIPTION OF THE PREFERRED EMBODIMENT

Figure 1:
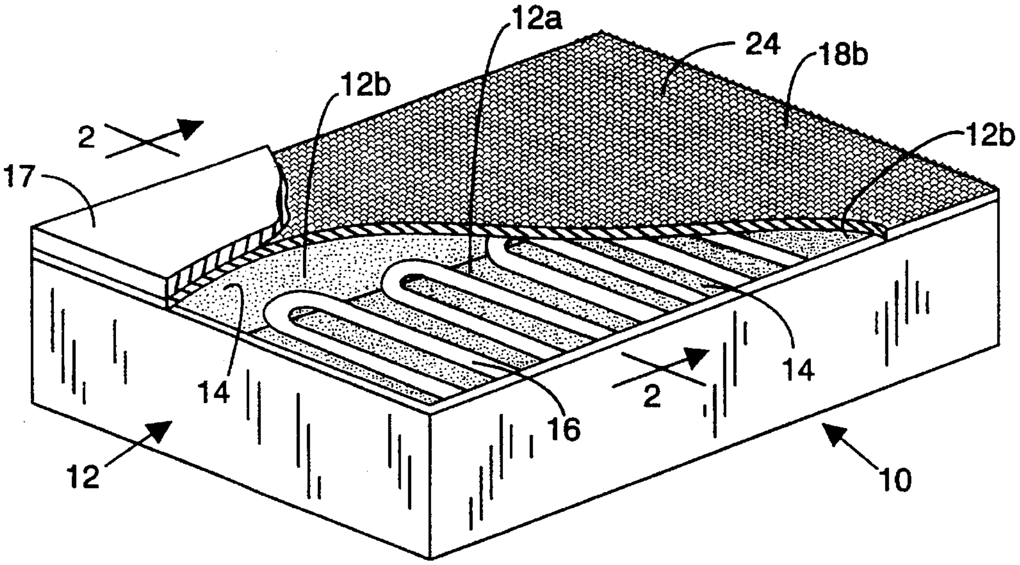
FIG. 1 illustrates in perspective a light box used as a backlight for a flat panel display in implementation of the present invention.

The preferred use of the present invention as illustrated in the drawings comprises generally a light box 10 having an opaque, open top enclosure 12 and a transparent exit window 18. Exit window 18 may be comprised of a variety of transparent materials, e.g., including glass and plastic. The preferred form of exit window 18, however, is glass as described hereafter. Within the enclosure 12 is a serpentine shaped light source 16 producing visible light impinging upon a diffusing coating 14 attached to the interior-facing surface 18*a* of window 18. The exit window 18 allows escape of this visible light from the box 10. As may be appreciated, a flat-panel LCD device 17 (shown partially and only in FIG. 1) is positioned against the exterior-facing surface 18*b* of window 18. Visibility of images presented on the LCD device is improved by the backlight provided by light box 10.

As may be appreciated, the light source 16 would typically be a fluorescent light source providing, in conjunction with the diffusing coating 14, a diffuse light source relative to the exit window 18 and flat-panel LCD device 17. An alternate configuration includes an ultraviolet light source 16 and provides as the diffusing coating 14 a phosphor material whereby the UV light produced by light source 16 would, upon striking the coating 14, produce visible diffuse light for application to the exit window 18 and flat-panel LCD device 17.

The exterior-facing surface 18*b* of window 18 includes a prismatic array 19 (better detailed in the partial view of FIG. 3) through which light passes as it exits box 10 before reaching the LCD device 17. The geometric configuration of the array 19 is selected with reference to the index of refraction for the material of the exit window 18 and its surrounding medium to optimize light energy emerging from the light box 10, i.e., within given view angles. In the illustrated embodiment of the present invention, the prismatic array 19 is defined by pyramid formations 24 at the surface 18*b* of window 18.

Figure 3:
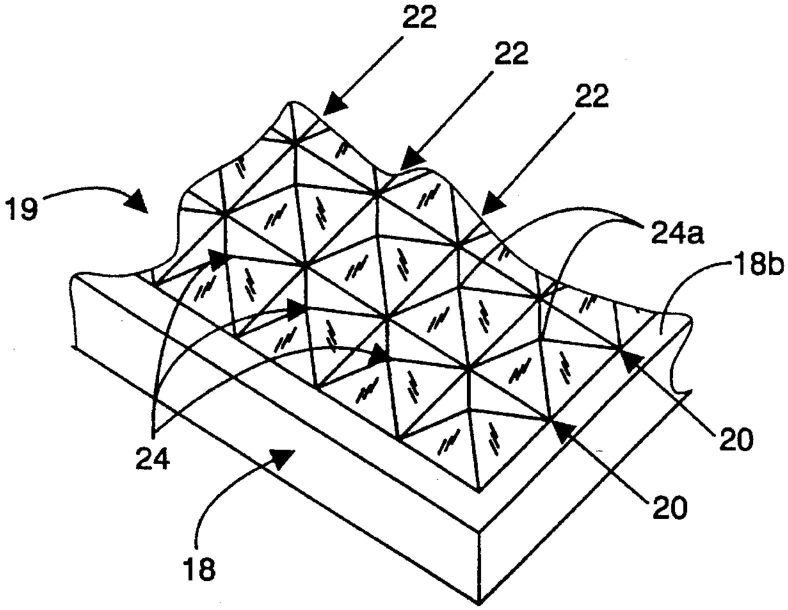
FIG. 3 illustrates a prismatic refracting array for the exit window the light box of FIG. 1.

FIG. 3 illustrates in more detail the pyramid formations 24 on the exterior surface of window 18. The pyramid formations 24 are defined by a first set of V-shaped grooves 20 and a second set of V-shaped grooves 22 orthogonal to grooves 20. Thus, each pyramid formation 24 includes four triangular facet surfaces each with a given angular orientation relative to an axis normal to the plane of exit window 18 and passing, for example, through the apex 24*a* of the pyramid formation 24. As used herein, this facet angle with respect to the normal axis for window 18 shall be referred to as the "prism angle." Thus, the prism angle specifies an angular orientation for the exit surfaces, collectively a non-planar exit boundary, for window 18.

Before illustrating details of the present invention, a brief discussion of light refraction at an interface boundary of two materials having different indices of refraction is in order. FIG. 4A illustrates refraction in a transparent glass plate 50. Angles referred to herein shall be with respect to parallel axes 52, each normal to the plate 50. Plate 50 interfaces at its upper planar surface 50*a* and lower planar surface 50*b* with air. Refraction, or the bending of light rays, naturally occurs of light as light crosses a boundary between media having different indices of refraction. In this example, the two media or interfacing materials are air and glass plate 50. The angular displacement of a light ray as it enters plate 50 is determined using Snell's Law, i.e., is a function of the indices of refraction of the interfacing materials.

Consider a light ray 54 approaching the surface 50*b* of plate 50 at an approach angle $\theta_1$, e.g., 30 degrees, relative to the normal axis 52. As the light ray 54 passes through the entrance boundary of surface 50*b*, it is refracted to a new path along angle $\theta_2$, indicated as the light ray 54*a*, within the plate 50. As light ray 54*a* encounters the exit boundary of surface 50*a* (parallel to surface 50*b*), it is again refracted according to Snell's Law and emerges from the plate 50 along emergence angle $\theta_3$, the same angle at which it approached plate 50 but displaced laterally as a function of the thickness of plate 50. The angle $\theta_2$ is calculated as follows:

$$n_1 \sin\theta_1 = n_2 \sin\theta_2$$

where $\theta_1=30°$ $n_1$=index of refraction for air=1.000

$n_2$=index of refraction for glass=1.55

$$1.000 \sin 30° = 1.55 \sin\theta_2$$

solving for $\theta_2$, we find $\theta_2=\sin^{-1}$ (0.50/1.55)

$\theta_2=18.8°$ at the surface 50*b*

The emergence angle $\theta_3$ at surface 50*a* is calculated as follows:

$$1.55 \sin 18.8° = 1.00 \sin\theta_3,$$

solving for $\theta_3$ $\theta_3=\sin^{-1}$ (0.322/1.55)

$\theta_3=30°$

Thus, light rays incident on plate 50 emerge from plate 50 at the same angle they enter plate 50, but laterally displaced as a function of the thickness of plate 50.

In a case where the exit surface 50*a* is oriented at an angle to the surface 50*b*, light rays traveling at angles exceeding the critical angle will be reflected, rather than transmitted with refraction. In the backlight box of FIG. 1, those rays would be returned to the light defusing coating 14 by total internal reflection, and will be scattered into other angles, and eventually most of this light will be emitted through the transparent plate 50.

Consider the light ray 62 in FIG. 4B entering the glass plate 60 at the surface 60*b*, and traveling within plate 60, after refraction at surface 60*a*, as indicated by the light ray 62*a*. The angle $\theta_4$ defines the approach orientation of light ray 62*a* relative to the exit boundary of surface 60. The magnitude of angle $\theta_4$, between the light ray 62 and the axis 64 normal to surface 60*a*, determines whether total internal reflectance of light ray 62*a* occurs. In the illustrated example of light ray 62, the angle $\theta_4$ exceeds the critical angle and is totally internally reflected at the surface 60*a* and remains within the plate 60 as the light ray 62*b*.

The critical angle is a function of the indices of refraction for the interfacing materials. For a glass plate having an index of refraction $n_2$ equal to 1.55, and air, having an index of refraction $n_1$ equal to 1.00, the critical angle $\theta_c$ is computed as follows:

$$\sin\theta_c = n_1/n_2$$

solving for $\theta_c$ $\theta_c=\sin^{-1} 1.000/1.55$ $\theta_c=40.2°$

Thus, light rays traveling within transparent exit window 18 and striking an exit boundary surrounded by air, e.g., the surface 60, at angles equal to or greater than 40.2 degrees relative to an axis normal to the exit boundary, e.g., axis 64, are totally internally reflected at the exit boundary.

The critical angle is identified with reference to an axis normal to the exit boundary surface. In the example of FIG. 4B, this reference axis would be the normal axis 64, i.e., relative to the plane of surface 60*a*. Thus, prism angles of formations 24 on the surface 18*b* of window 18 do not change the calculation of critical angle, but must be considered when identifying the orientation of an exit boundary surface with respect to an exiting light ray. The prism angle under the present invention is selected, however, with reference to the critical angle of materials used. This prevents light from leaving window 18 at angles wider than desired, as happens with current devices employing 45 degree grooves in optical lighting films.

Figure 2:
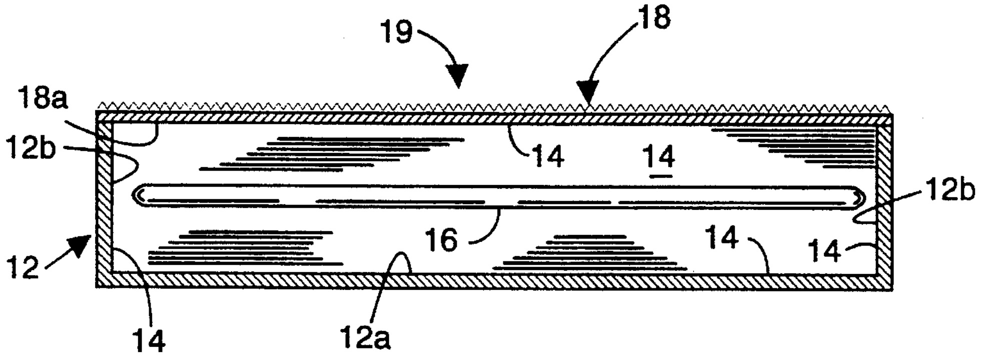
FIG. 2 is a sectional view of the light box of FIG. 1 as taken along lines 2—2 of FIG. 1.

Returning to FIGS. 1–3, all the light rays originating within box 10 and traveling from the air, the less dense medium, into window 18, the more dense medium, are accepted by window 18. The light rays are refracted as they enter window 18 in accordance with Snell's Law. All the light rays that enter window 18, however, will not necessarily emerge from window 18. When, in accordance with the present invention, the prism angle for prism formations 24 matches the critical angle for window 18 and its surrounding medium, e.g., air, virtually no light rays traveling within window 18 wider than the critical angle are emitted from the prismatic exit boundary.

FIG. 5 illustrates the loss to total internal reflectance resulting from a prism angle not matching, in this case exceeding, the critical angle as determined by the indices of refraction for window 18' and surrounding air. The window 18 in FIG. 5 includes prism formations 80 having a prism angle of 45 degrees. The critical angle, however, for window 18 and surrounding air, as calculated above, is 40.2 degrees. Thus, in the example of FIG. 5, the critical angle is approximately 4.8 degrees less than the prism angle.

The primary emergence cone angle $\theta_e$ for window 18' is obtained by identifying the angle $\theta_{tir}$. The angle $\theta_{tir}$ corresponds to the angular separation between facets of the formations 80 and the boundary of the emergence angle $\theta_e$. Knowing the angular orientation between facets of the formations 80, i.e., $\theta_f$, and the angle $\theta_{tir}$, the emergence angle $\theta_e$ may be calculated. In the example of FIG. 5, the facets of formations 80 lie at 90 degrees relative to one another, i.e., $\theta_f=90°$, and the emergence angle $\theta_e$ is calculated as $\theta_f-(2*\theta_{tir})$.

To calculate the angle $\theta_{tir}$, a deflection angle $\theta_{d1}$ is calculated as the prism angle minus the critical angle. In the present illustration, the deflection angle $\theta_{d1}$ equals 4.8 degrees. Using Snell's Law, a corresponding angle $\theta_{t1}$ is identified as a range of angular orientation of light rays approaching the undersurface of window 18 which result in light rays refracted within the deflection angle $\theta_{d1}$. In the present illustration, the angle $\theta_{t1}$ equals 7.5 degrees. A corresponding deflection angle $\theta_{d2}$ equals 4.8 degrees, and its corresponding angle $\theta_{t2}$ equals 7.5 degrees. The sum of angles $\theta_{t1}$ and $\theta_{t2}$ are approximately equal to $\theta_{tir}$. In this case, $\theta_{tir}$ is calculated as being approximately 15 degrees. Accordingly, the emergence angle $\theta_e$ is approximately 60 degrees, i.e., 90–(2*15).

Light which has been reflected by total internal reflection is returned to the defusing coating 14. From coating 14, light can be reflected toward region 80, where it will strike exit surface at such an angle that it will be emitted into the secondary emittance cone. This light can be considered as lost due to total internal reflectance.

To calculate loss associated with the prism arrangement of FIG. 5, consider the semicircle 100 having a radius of one unit and centered on the point 102, also designated B. Light rays traveling within the plane of semicircle 100 and incident at the point 102 are represented by the area of semicircle 100. The amount of light incident at the point 102 and lost due to total internal reflectance inside window 18 can be closely approximated by calculating the area of the sector subtended by the angle $\theta_{tir}$, i.e., approximated by the area of the sector indicated by points ABC.

The formula for the area of the semicircle 100 is:

$$a=\tfrac{1}{2}\pi r^2.$$

for this example $$a=1.571$$

The solution for the area $a_s$ of sector ABC as subtended by the angle $\theta_{tir}$ is:

$$a_s=\tfrac{1}{2}r^2\theta_{tir} \text{ (with } \theta_{tir} \text{ expressed in radians)}$$

$$a_s=0.131.$$

The percent loss associated with the 45° prism angle illustrated in FIG. 5 is, therefore, $(a_s/a)*100\%$, or $(0.131/1.571)*100\%$, approximately 8.33%.

In general, it can be seen that light rays entering the surface 50*b* at angles within the range of $\theta_{tir}$ experience total internal reflection at exit surface boundaries defined by the facets of prism formations 80. The consequence is a less efficient light source. In this case, the consequence is a light source less efficient by approximately 8.33%.

When the prism angle does not match the critical angle, as determined by the two interfacing materials, the limits of angular displacement of the emerging light rays are truncated by the prism angle and the angle of total internal reflectance where, the upper limit is perpendicular to the prism angle and the lower limit is normal to the prism angle minus the angle of total internal reflectance. However, when the prism angle matches, the critical angle as under the present invention, the emergence cone is defined by an axis normal to the prism angle.

Figure 6:
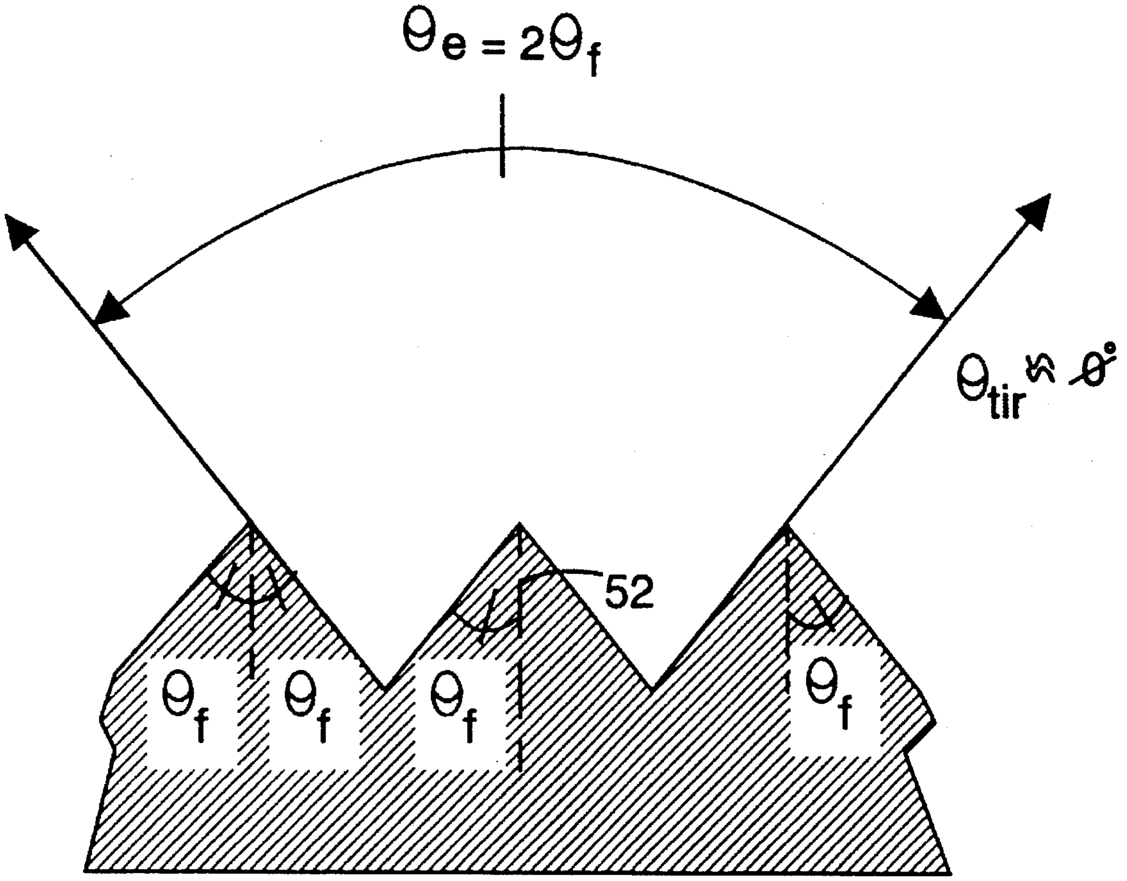
FIG. 6 illustrates refraction through an exit window of the light box of FIG. 1 using a prism angle matching a critical angle in accordance with a preferred form of the present invention to minimize or eliminate light lost to total internal reflectance.

FIG. 6 illustrates the result of matching a prism angle to the critical angle of the light box 10. More particularly, window 18 of FIG. 6 has prism formations 24 defining its exterior surface or exit boundary. The prism formations 24 have prism angles equal to the critical angle of window 18 and surrounding air, i.e., prism angles equal to 40.2 degrees in the present illustration. As a result, no internal reflectance loss occurs at the exit boundary of window 18. Thus, all light rays entering exit window 18 emerge within the emergence angle $\theta_e$.

This technique provides directional gain and an increased light output of the backlight assembly with the same input power. The prism angle of the achromatic refracting prism is matched exactly to the critical angle of the interfacing material to acquire maximum efficiency and avoid loss to total internal reflectance. The viewing angle is determined via prism angle and material selection, controlling both functions are desirable in flat panel backlighting schemes.

The present invention further contemplates selecting a view or emergence angle and then manipulating the index of refraction for the exit window relative to the index of surrounding material, typically air, to satisfy the selected emergence angle. Availability of materials allowing selection of the index of refraction make possible this aspect of the present invention.

It is suggested that microminiature molding technology be used to implement formation of very small prism formations 24 on the surface **18*b* of exit window 18**.

This invention has been described herein in considerable detail in order to comply with the Patent Statutes and to provide those skilled in the art with the information needed to apply the novel principles and to construct and use such specialized components as are required. However, it is to be understood that the invention is not restricted to the particular embodiment that has been described and illustrated, but can be carried out by specifically different equipment and devices, and that various modifications, both as to the equipment details and operating procedures, can be accomplished without departing from the scope of the invention itself.

The embodiments of the invention in which an exclusive property or right is claimed are defined as follows:

1. In a flat panel light box containing a light source for use as a backlight in an LCD device, an improvement comprising:

a transparent exit window defining an exit plane for light from said light box, said exit window having a given index of refraction and critical angle as a function of a surrounding medium; and facet formations integral to said exit window which comprise prismatic formations, each prismatic formation carrying a plurality of facet surfaces and each of said facet surfaces is orientated at said critical angle relative to an axis normal to said exit plane.

2. An improvement according to claim 1 wherein said light source is a fluorescent lamp emitting visible light.

3. An improvement according to claim 1 wherein said exit window is a transparent material and said given index of refraction is between 1.15 and 2.9.

4. An improvement according to claim 2 wherein said transparent exit window comprises one of the materials glass and plastic.

5. An improvement according to claim 1 wherein the light source is a lamp emitting ultraviolet radiation and wherein the exit window carries a phosphorescent coating converting ultraviolet radiation to visible radiation.

6. An improvement according to claim 1 wherein said surrounding medium is air.

7. An improvement according to claim 1 wherein said facet formations comprise a plurality of adjacent parallel groves, the inner surfaces of said grooves defining said facet surfaces.

8. An improvement according to claim 7 wherein said grooves are V-shaped grooves.

9. An improvement according to claim 1 wherein said facet formations comprise prismatic formations, each prismatic formation carrying at least four facet surfaces.

10. An LCD device comprising:

a light source;

an enclosure containing said light source, said enclosure including a planar transparent exit window defining an inner plane exposed to said light source and an outer plane opposite said inner plane, said outer plane being substantially parallel to said inner plane, said exit window having a given index of refraction defining in conjunction with a surrounding medium a critical angle, at least one of said inner and outer surfaces being non-planar and including facet formations defining facet surfaces, said facet surfaces are orientated at said critical angle relative to an axis normal to said outer plane; and a liquid crystal panel in face-to-face relation to said outer surface.

11. An LCD device according to claim 10 wherein said exit window comprises one of the materials glass and plastic.

12. An LCD device according to claim 10 wherein said facet formations comprise a plurality of adjacent parallel groves, the inner surfaces of said grooves defining said facet surfaces.

13. An LCD device according to claim 12 wherein said grooves are V-shaped grooves.

14. An LCD device according to claim 10 wherein said facet formations comprise prismatic formations, each prismatic formation carrying at least four facet surfaces.

15. An exit window in a display device, the display device including a visible light source, an enclosure containing said light source and allowing exit therefrom said diffuse light, and a display panel including light transmitting portions and selectively opaque portions in implementation of a display presentation, said exit window directing said diffuse light within view angles relative to said display presentation, said exit window comprising:

a transparent generally planar plate, said plate including a first planar surface exposed to said diffuse light source, said first surface defining an exit plane for said display device, said plate having a first index of refraction;

a transparent medium surrounding said plate and having a second index of refraction defining in conjunction with said first index of refraction a critical angle; and transparent surface formations defining a second surface of said plate, said second surface being non-planar and opposite said first surface, said surface formations establishing a plurality of facet surfaces of said plate, each facet surface is orientated at said critical angle relative to an axis normal to said exit plane.

16. An exit window according to claim 15 wherein said exit window comprises one of the materials glass and plastic.

17. An exit window according to claim 15 wherein said facet formations comprise a plurality of adjacent parallel groves, the inner surfaces of said grooves defining said facet surfaces.

18. An exit window according to claim 17 wherein said grooves are V-shaped grooves.

19. An exit window according to claim 15 wherein said facet formations comprise prismatic formations, each prismatic formation carrying at least four facet surfaces.

* * * * *